United States Patent
Nakashima

[11] Patent Number: 6,103,282
[45] Date of Patent: Aug. 15, 2000

[54] MISO SOUP BEVERAGE CONTAINED IN A SEALED CONTAINER AND METHOD FOR ITS PRODUCTION

[75] Inventor: Yoshihiko Nakashima, Sasebo, Japan

[73] Assignee: Nagasaki Kaidou Bussan Kabushikikaisha, Japan

[21] Appl. No.: 09/185,540

[22] Filed: Nov. 4, 1998

[30] Foreign Application Priority Data

| Nov. 14, 1997 | [JP] | Japan | 9-331073 |
| Mar. 26, 1998 | [JP] | Japan | 10-098529 |
| Apr. 17, 1998 | [JP] | Japan | 10-107792 |
| Apr. 28, 1998 | [JP] | Japan | 10-119149 |
| Jul. 14, 1998 | [JP] | Japan | 10-198614 |
| Aug. 19, 1998 | [JP] | Japan | 10-232803 |

[51] Int. Cl.⁷ .......... B65D 85/00; A23L 1/238; A23L 1/40
[52] U.S. Cl. .......... 426/130; 426/399; 426/401; 426/443; 426/589
[58] Field of Search .......... 426/130, 131, 426/589, 399, 401, 443, 106

[56] References Cited

FOREIGN PATENT DOCUMENTS

| 358047475 | 3/1983 | Japan . |
| 358134978 | 8/1983 | Japan . |
| 358146261 | 8/1983 | Japan . |
| 5-56770 | 3/1993 | Japan . |

OTHER PUBLICATIONS

T. Kohno—Particles of MISO, Sep. 21, 1994 (1st Ed.) cover page and pp. 28–31 & Translation.

*Primary Examiner*—Nina Bhat
*Attorney, Agent, or Firm*—Smith, Gambrell & Russell

[57] ABSTRACT

A miso soup beverage contained in a sealed container which is excellent in the flavor, taste and storage stability, is produced by preparing a miso soup by using starting materials containing at least miso and a milk material, finely grinding it by a homogenizer, and charging and sealing it in a container and then heat sterilizing it, or heat sterilizing it and then charging and sealing it in a container. The milk material is preferably one obtained by a lactic acid fermentation. In addition to the miso and milk material, at least one selected from soy bean, ingredient materials, a seasoning and a thickening agent, may be contained.

16 Claims, No Drawings

MISO SOUP BEVERAGE CONTAINED IN A SEALED CONTAINER AND METHOD FOR ITS PRODUCTION

BACKGROUND OF THE INVENTION

The present invention relates to a miso soup beverage contained in a sealed container which can readily be drunk anytime and anywhere, and a method for producing it.

Miso soup which is one of Japanese popular traditional soups, is usually made by preparing a soup stock, putting ingredients therein and then dissolving miso (fermented soybean paste) therein. It has been commonly known that miso soup is preferably prepared and drunk on the spot to enjoy its good flavor.

However, with the increase of single life persons by the change of lifestyle, instant miso soup which can readily be drunk, has increasingly used. The instant miso soup is obtained by, for example, mixing a miso dried up to a water content of at most 5% by freeze-drying, natural seasonings and chemical seasonings, and adding ingredient materials such as Welsh onion freeze-dried or hot-air dried thereto.

However, the flavor of the instant miso soup tends to remarkably deteriorate by the drying treatment of miso or ingredient materials, and particularly there is a problem that the original flavor of the ingredient materials can hardly be tasted.

Further, products have been known which are obtained by charging a miso soup in a container such as a can and subjected to sterilization treatment to impart storage stability, and sold by e.g. vending machines. However, such products have a problem that the flavor and taste are poor and precipitates or the like tend to form during storage.

SUMMARY OF THE INVENTION

It is an object of the present invention to provide a miso soup beverage contained in a sealed container which provides original flavor of a miso soup sufficiently, and excellent taste, and scarcely undergo deterioration of the flavor, and a method for its production.

To accomplish the above object, the present invention provides a miso soup beverage contained in a sealed container wherein a miso soup beverage is charged and sealed in a container and heat sterilized, which comprises miso and a milk material, wherein the solid contents of the miso soup beverage are finely ground.

The present invention also provides a method for producing a miso soup beverage contained in a sealed container, which comprises preparing a miso soup by using a starting material containing at least miso and a milk material, and finely grinding the miso soup by a homogenizer, followed by charging and sealing in a container and then heat sterilizing, or heat sterilizing and then charging and sealing in a container.

According to the present invention, by incorporating the milk material as the starting material of the miso soup, the flavor and thermal stability are improved, deterioration of flavor scarcely occurs even heat sterilization is conducted, and the original excellent flavor of the miso soup can be maintained over a long period of time.

Further, the solid contents in the miso soup are finely ground and the dispersion stability is improved by the addition of the milk material, whereby it is possible to provide a miso soup beverage wherein the sold contents hardly precipitate and the feeling to the tongue and the taste or feeling at the throat are excellent.

Further, since the miso soup is charged and sealed in a container and heat sterilized, it stands long time storage and can be drunk as it is without using e.g. chopsticks or spoon, whereby it is suitable for sale by vending machines, or sale by booths or kiosks of stations, convenience stores and box lunch shops.

DESCRIPTION OF THE PREFERRED EMBODIMENTS

Hereinafter, the present invention will be described in further detail with reference to preferred embodiments.

In the present invention, as the miso, one or two or more selected from e.g. shiro-miso, aka-miso, awase-miso and koji-miso, are used.

As the milk material, dairy products not subjected to lactic acid fermentation, for example, milk, condensed milk, skim milk powder, milk powder and skim milk, may be used. However, dairy products subjected to lactic acid fermentation are preferably used.

As the dairy products subjected to lactic acid fermentation, dairy products in a semi-gelled or liquid form obtained by adding lactic acid bacteria to milk for fermentation, for example, yogurt and lactic acid bacteria beverage are preferably used. As the dairy products subjected to lactic acid fermentation, both ones not sterilized and ones sterilized may be used. However, the ones sterilized are particularly preferred.

As the dairy products subjected to lactic acid fermentation but not sterilized, for example, yogurt and raw lactic acid beverage may be mentioned. As the raw lactic acid beverage, for example, "Yakult" (trade name, manufactured by Yakult Honsha Co.,Ltd.) has been known. Further, as the dairy products subjected to lactic acid fermentation and sterilized, for example, a sterilized lactic acid beverage may be mentioned, and for example, "Calpis" (trade name, manufactured by Calpis Food Industry Co.,Ltd.) has been known. Further, the above mentioned "Yakult" and "Calpis" contain saccharides such as sucrose, and dairy products having such saccharides incorporated may be used.

In the present invention, one or two or more selected from the above dairy products may be used. By adding the dairy products as the starting material, the flavor, thermal stability and dispersibility can be made excellent.

In the present invention, as the starting material, in addition to the miso and milk material, soy milk (tonyu) may be used. As the soy milk, for example, ones obtained by immersing soy bean in water, grinding and then heating it, and then separating and removing okara (bean-curd refuse), may preferably be used. However, ones obtained by hydrolyzing soy bean flour or soy protein isolate may, for example, be used. The soy protein isolate may be directly added to the starting material of the miso soup, but preferably added by dispersing it in an adequate amount of water. By adding soy milk, it is possible to impart the flavor of tofu (soybean curd) to the miso soup.

Further, as the starting material, ingredient materials, seasonings, thickening agents or the like may be added. As the ingredient materials, the following may, for example, be used: vegetables such as Welsh onion, onion, ginger, spinach, potato, taro, pumpkin and carrot, mushrooms such as shiitake (oriental black mushroom or black forest mushroom), nameko (Japanese mushroom, sticky round type) and shimeji (Japanese mushroom, blackish small type), seaweeds such as wakame seaweed, shellfishes such as crab, shrimp, corbicula and short-necked clam, meat such as pork and chicken, and processed foods such as tofu, abura-age (fried soybean curd), konnyaku (devil's tongue) and kamaboko (boiled fish-paste).

Further, as the seasoning, shellfish extract obtained by concentrating a broth obtained by boiling shellfishes in hot water, natural seasonings prepared from katsuo-bushi (dried bonito), niboshi (dried small sardines) or konbu (kelp), and chemical seasonings such as sodium glutamate or inosinic acid, may, for example, be used.

The shellfish extract is not particularly limited so long as it is suitable to the flavor of the miso soup, and an extract of corbicula or short-necked clam may, for example, be mentioned. The extract may be in a liquid or powdery state.

As the thickening agent, processed starch such as pregelatinized starch and cross-linked starch and thickening polysaccharides such as locust-bean gum, guar gum and carageenan may, for example, be used.

In the present invention, the blend ratio of respective materials in the miso soup, is not particularly limited, but preferably the miso soup contains from 3 to 100 parts by weight of the milk material as a product having a protein concentration of 3 wt %, and from 1,500 to 2,000 parts by weight of water, based on 100 parts by weight of the miso. If the content of the milk material is less than the above range, the effects for improving the flavor, thermal stability and dispersibility, are likely to low, and if exceeds the above range, the original flavor of the miso soup will be lost, such being undesirable.

As the container used in the present invention, for example, cans, bottles, bag-like containers (pouch) made of a heat-resistant laminate film, and paper containers used for milk packs, may, for example, be used. Among them, paper containers are preferably used which undergo less deposition of a smell of can in view of the retainment of flavor.

The miso soup beverage contained in a sealed container of the present invention, is produced by, for example, the following methods.

Namely, a milk material and if the case requires, soy milk, ingredient materials, seasonings, thickening agents or the like, are added to water, and heated, and then miso is added by dissolving it therein, to prepare a miso soup. This miso soup is finely ground with e.g. a homogenizer. In this instance, the grinding conditions of the homogenizer are preferably adjusted so that the solid contents in the miso soup have a mean particle size of at most 0.15 mm, and the solid contents having a particle size of at most 0.2 mm occupies at least 80% and the solid contents having a particle size of at most 0.3 mm occupies at least 90%, of the whole solid contents.

In the present invention, "the solid contents in the miso soup" include whole solid contents contained in the miso soup, such as particles of miso and finely ground substances of the ingredient materials.

If the mean particle size of the solid contents in the miso soup exceeds 0.15 mm and the particle size distribution is outside the above range, i.e. much coarser particles are seen, when the miso soup is kept or held in one's mouth, it is likely to feel roughness to the tongue, whereby the feeling to the tongue and the taste or feeling at the throat will be poor, such being undesirable.

In this connection, the mean particle size and the particle size distribution of the solid contents in the miso soup, can be measured by a method such as inspection with a microscope (including the use of photographs), a particle size distribution tester or a filtration system with a standard sieve.

After the homogenization by finely grinding the solid contents in the miso soup, the miso soup may be heated again if the case requires. The order of addition of respective starting materials, and the order of the fine grinding and heat treatment, may be appropriately changed depending upon the properties of the materials. Further, when a seasoning, for example, konbu, niboshi or katsuo-bushi, is used, it is preferred to add the seasoning to water and extract the essence thereof to prepare a soup stock, and then add other materials to the soup stock. Further, at the stage where the essence is taken out or after the miso soup is prepared, the konbu, niboshi or katsuo-bushi used may be removed.

Then, the thus obtained miso soup is charged in a container, and sealed, and then, heat sterilization is conducted at a temperature of from 100 to 120° C. for from 10 to 30 minutes. Otherwise, a hot pack method may be used, wherein after the miso soup is preliminarily heat sterilized at a temperature of from 110 to 150° C. for from 10 to 120 seconds, the miso soup is charged in a container at such a state that the product temperature is still high, and the inside of the container is sterilized by the heat of the product. Further, after the miso soup is preliminarily heat sterilized under the above conditions, the miso soup under the aseptic condition may be charged in the container and then sealed. Further, when the miso soup is charged in the container, it is preferred to vacuum deaerate the inside of the container or, after the miso soup is charged, charge an inactive gas such as nitrogen therein.

TEST EXAMPLE 1

To 300 parts by weight of a soup stock, 30 parts by weight of miso, 70 parts by weight of tofu (soybean curd), 25 parts by weight of nameko (Japanese mushroom, sticky round type) and 5 parts by weight of Welsh onion processed in small pieces were added, and this was heated, and then finely ground by a homogenizer. In this instance, by changing the treatment conditions of the homogenizer, two types of miso soup beverages which were different in the size of granulation, were prepared. The particles sizes of the solid contents of the two types of the miso soup beverages were as follows.

(1) the mean particle size of the solid contents was 0.1 mm, and the solid contents having a particle size of at most 0.2 mm occupied 90% and the solid contents having a particle size of at most 0.3 mm occupied 95%, of the whole solid contents. (Sample 1)

(2) the mean particle size of the solid contents was 0.2 mm, and the solid contents having a particle size of at most 0.2 mm occupied 50% and the solid contents having a particle size of at most 0.3 mm occupied 70%, of the whole solid contents. (Sample 2)

Further, a usual miso soup of which the miso and ingredient materials as the starting materials were not finely ground, was prepared and referred to as Sample 3.

Seven trained panelists were asked to sample the miso soup beverages, i.e. Samples 1, 2 and 3, for organoleptic examination, and as a result, these samples were evaluated as follows. Sample 1: the feeling to the tongue and the taste or feeling at the throat were excellent, Sample 2: roughness to the tongue, and Sample 3: since the ingredient materials were not ground, it was impossible to drink it like normal beverage.

TEST EXAMPLE 2

To 400 parts by weight of a soup stock, 30 parts by weight of miso, 100 parts by weight of kabu (turnip), 50 parts by weight of stalk of kabu, 10 parts by weight of abura-age (fried soybean curd) processed in small pieces and 0.4 parts by weight of sodium glutamate were added, and this was heated, and then finely ground by a homogenizer. In this instance, by changing the treatment conditions of the homogenizer, two types of miso soup beverages which were different in the size of granulation, were prepared. The particles sizes of the solid contents of the two types of the miso soup beverages were as follows.

(1) the mean particle size of the solid contents was 0.12 mm, and the solid contents having a particle size of at most 0.2 mm occupied 90% and the solid contents having a particle size of at most 0.3 mm occupied 99%, of the whole solid contents. (Sample 4)

(2) the mean particle size of the solid contents was 0.25 mm, and the solid contents having a particle size of at most 0.2 mm occupied 65% and the solid contents having a particle size of at most 0.3 mm occupied 75%, of the whole solid contents. (Sample 5)

Seven trained panelists were asked to sample the miso soup beverages, i.e. Samples 4 and 5, for organoleptic examination, and as a result, these samples were evaluated as follows. Sample 4 was more pleasant to the palate and tasty than Sample 5.

TEST EXAMPLE 3

With respect to the miso soup beverages of Samples 1 and 2, sedimentation rate test with time was made by using a graduated cylinder. As a result, the miso soup beverage of Sample 1 showed about 0.8 times of the sedimentation rate as compared with the miso soup beverage of Sample 2.

Further, with respect to the miso soup beverages of Samples 4 and 5, sedimentation rate test with time was made in the same manner as above. As a result, the miso soup beverage of Sample 4 showed about 0.8 times of the sedimentation rate as compared with the miso soup beverage of Sample 5.

From the above results, it was found that by the fine grinding treatment, the dispersion stability of the product is improved and also the feeling to the tongue and the taste or feeling at the throat are made excellent.

PREPARATION EXAMPLE 1

(Preparation of a lactic acid bacteria beverage)

Using 30 kg of skim milk powder, 90 liters of water, 1.8 liters of a pre-culture medium (starter) of lactic acid bacteria, 30 kg of sucrose and 50 kg of corn syrup, fermentation was conducted by a conventional manner to prepare a lactic acid fermented milk.

PREPARATION EXAMPLE 2

(Preparation yogurt)

Using 1,000 parts by weight of skim milk powder, 150 parts by weight of condensed milk, 1.8 liters of a pre-culture medium (starter) of lactic acid bacteria and 50 parts by weight of sucrose, fermentation was conducted by a conventional manner to prepare yogurt.

EXAMPLE 1

Into 2,000 parts by weight of water heated to 80° C., 2 parts by weight of a seasoning (trade name "Hondashi", manufactured by Ajinomoto Co.,Ltd.) was added, and then 100 parts by weight of shiro-miso and 50 parts by weight of aka-miso were leached and added. Then, 50 parts by weight of the lactic acid fermented milk prepared in PREPARATION EXAMPLE 1 was added thereto and mixed by stirring, and solid contents were finely ground by a homogenizer to prepare a miso soup. This miso soup was heat sterilized at 130° C. for 70 seconds, and cooled to 25° C., and then charged in a box-type container under aseptic condition and sealed to prepare a miso soup beverage contained in a sealed container.

COMPARATIVE EXAMPLE 1

A miso soup beverage contained in a sealed container was prepared in the same manner as in EXAMPLE 1 except that the lactic acid fermented milk was not added.

TEST EXAMPLE 4

The miso soups obtained in EXAMPLE 1 and COMPARATIVE EXAMPLE 1 were maintained at a temperature of 10° C. or 75° C., and seven panelists were asked to sample them for organoleptic examination with respect to change with days of the flavor of the miso soups. The results are indicated in Table 1. Each numeral representing the evaluation in the table, is the number of persons who indicated the flavor to be excellent under each condition.

TABLE 1

| Days elapsed | EXAMPLE 1 | | COMP. EX. 1 | |
| --- | --- | --- | --- | --- |
| (day) | 10° C. | 75° C. | 10° C. | 75° C. |
| 0 | 5 | 5 | 4 | 4 |
| 30 | 5 | 5 | 4 | 3 |
| 60 | 5 | 5 | 4 | 2 |
| 120 | 5 | 4 | 4 | — |
| 240 | 5 | — | 3 | — |
| 360 | 5 | — | 3 | — |

As indicated in Table 1, the miso soup beverage of EXAMPLE 1 containing the lactic acid fermented milk shows excellent flavor and less change with time as compared with the miso soup beverage of COMPARATIVE EXAMPLE 1 containing no lactic acid fermented milk.

EXAMPLE 2

To 1,400 parts by weight of water heated to 80° C., 100 parts by weight of strained awase-miso, 80 parts by weight of lard processed in small pieces, and 30 parts by weight of godo (burdock root) which was subjected to removal of harshness and was preliminarily boiled and processed in small pieces, were added, and further 80 parts by weight of yogurt obtained in PREPARATION EXAMPLE 2 was added, and this was mixed by stirring, followed by finely grinding the solid contents by a homogenizer to prepare a miso soup. This miso soup was charged in an empty can and sealed under reduced pressure, and subjected to heat sterilization at 100° C. for 30 minutes, and then cooled to prepare a miso soup beverage contained in a sealed container.

COMPARATIVE EXAMPLE 2

A miso soup beverage contained in a sealed container was prepared in the same manner as in EXAMPLE 2 except that yogurt was not added.

TEST EXAMPLE 5

The miso soups contained in a sealed container, obtained in EXAMPLE 2 and COMPARATIVE EXAMPLE 2 were maintained at a temperature of 33° C., and five panelists were asked to sample them for organoleptic examination with respect to the change with days of the flavor of the miso soups. The results are indicated in Table 2. Each numeral representing the evaluation in the table, is the number of persons who indicated the flavor to be excellent under each condition.

TABLE 2

| Days elapsed (day) | EXAMPLE 2 | COMP. EX. 2 |
|---|---|---|
| 0 | 5 | 4 |
| 15 | 5 | 4 |
| 30 | 5 | 4 |
| 60 | 5 | 3 |
| 120 | 4 | 3 |
| 240 | 4 | 2 |
| 360 | 3 | 2 |

As indicated in Table 2, EXAMPLE 2 containing yogurt shows excellent flavor and less change with time as compared with COMPARATIVE EXAMPLE 2 containing no yogurt.

PREPARATION EXAMPLE 3

100 parts by weight of skim milk was heated at 80° C. for from 20 to 30 minutes and cooled, and then Lactobacillus bulgaricus was inoculated thereto, and fermentation was conducted at a temperature of 38° C. for from 1 to 2 days. After completion of the fermentation, the temperature was raised to 60° C. and homogenized in a homogenizer. 160 parts by weight of sucrose was added thereto, and stirring was conducted at 80° C. for 20 minutes to dissolve the sucrose and at the same time to conduct a heat sterilization treatment, to prepare a heat sterilized lactic acid fermented milk.

EXAMPLE 3

To 4,000 g of water, 400 g of soy milk (protein content: 2.5 wt %) was added, and this was mixed by stirring at a temperature of 90° C. Then, to this aqueous solution, 300 g of miso and 30 g of a lactic acid fermented milk obtained in PREPARATION EXAMPLE 3 (protein content: 3 wt %) were added, and solid contents were finely ground by a homogenizer. This mixed solution was heated to 90° C. again to prepare a miso soup. This miso soup was charged in an empty can, and sealed under reduced pressure, and heat sterilization was conducted at a temperature of 110° C. for 20 minutes, and then, cooled to prepare a miso soup beverage containing soy milk charged in a sealed container.

COMPARATIVE EXAMPLE 3

A miso soup beverage containing soy milk was prepared in the same manner as in EXAMPLE 3 except that the lactic acid fermented milk was not added.

EXAMPLE 4

To 4,000 g of water, 300 g of soy milk (protein content: 3 wt %) was added, and this was mixed by stirring at a temperature of 95° C. Then, to this aqueous solution, 500 g of a low-salt miso, 25 g of "Calpis" (trade name, manufactured by Calpis Food Industry Co.,Ltd., protein content: 3 wt %), 3 g of shoga (ginger root) cut in small pieced, 10 g of Welsh onion and 0.2 g of locust-bean gum were added, and solid contents were finely ground by a homogenizer. This mixed solution was heated to 90° C. again to prepare a miso soup. This miso soup was charged in an empty can, and sealed under reduced pressure, and heat sterilization was conducted at a temperature of 110° C. for 20 minutes, and then, cooled to prepare a miso soup beverage containing soy milk charged in a sealed container.

TEST EXAMPLE 6

Seven reliable panelists were asked to sample the miso soup beverages obtained in EXAMPLES 3 and 4 and COMPARATIVE EXAMPLE 3, for organoleptic examination, and as a result, these samples were evaluated as follows. EXAMPLES 3 and 4 are superior in the flavor and taste to COMPARATIVE EXAMPLE 3.

TEST EXAMPLE 7

With respect to the miso soup beverages of EXAMPLE 3 and COMPARATIVE EXAMPLE 3, sedimentation rate test with time was made by using a graduated cylinder. As a result, the miso soup beverage of EXAMPLE 3 containing a lactic acid fermented milk showed about ½ of the sedimentation rate as compared with the miso soup beverage of COMPARATIVE EXAMPLE 3 containing no lactic acid fermented milk. From the above results, it was found that the dispersibility is improved by the addition of the lactic acid fermented milk.

EXAMPLE 5

Into 2,000 parts by weight of water heated to 100° C., 2 parts by weight of a seasoning (trade name "Hondashi", manufactured by Ajinomoto Co.,Ltd.) was added, and then 75 parts by weight of shiro-miso and 75 parts by weight of aka-miso were leached and added. Then, 50 parts by weight of a commercially available milk was added thereto, and solid contents were finely ground by a homogenizer to prepare a miso soup. This miso soup was charged in an empty can and sealed under reduced pressure, and then heat sterilized at 110° C. for 20 minutes, and cooled to prepare a miso soup beverage contained in a sealed container.

COMPARATIVE EXAMPLE 4

A miso soup beverage contained in a sealed container was prepared in the same manner as in EXAMPLE 5 except that the commercially available milk was not added.

TEST EXAMPLE 8

The miso soups contained in a sealed container, obtained in EXAMPLE 5 and COMPARATIVE EXAMPLE 4 were maintained at a temperature of 10° C. or 80° C., and five panelists were asked to sample them for organoleptic examination with respect to the change with days of the flavor of the miso soup. The results are indicated in Table 3. The evaluation in the table indicate the average points (court fractions of 0.5 and over as a unit and cut away the rest) of all panelists with the following standard. 4: excellent, 3: a little unpleasant, 2: substantially unpleasant, and 1: diminish appetite.

TABLE 3

| Days elapsed | EXAMPLE 5 | | COMP. EX. 4 | |
|---|---|---|---|---|
| (day) | 10° C. | 80° C. | 10° C. | 80° C. |
| 0 | 4 | 4 | 3 | 3 |
| 30 | 4 | 4 | 3 | 2 |
| 60 | 4 | 3 | 3 | 1 |
| 120 | 4 | 3 | 2 | — |
| 240 | 4 | — | 2 | — |
| 360 | 4 | — | 2 | — |

As indicated in Table 3, the miso soup beverage EXAMPLE 5 containing milk shows excellent flavor and less change with time as compared with the miso soup beverage of COMPARATIVE EXAMPLE 4 containing no milk.

EXAMPLE 6

To 2,800 parts by weight of water heated to 100° C., 200 parts by weight of strained awase-miso, 160 parts by weight of lard processed in small pieces, and 60 parts by weight of gobo (burdock root) which was subjected to removal of harshness and was preliminarily boiled and processed in small pieces, were added, and then finely ground by a homogenizer and cooled to prepare a miso soup. To this miso soup, 1 g of skim milk was added, and this was mixed by stirring. This miso soup was charged in en empty can under reduced pressure and sealed, and subjected to heat sterilization at 100° C. for 30 minutes, and then cooled to prepare a miso soup beverage contained in a sealed container.

COMPARATIVE EXAMPLE 5

A miso soup beverage contained in a sealed container was prepared in the same manner as in EXAMPLE 6 except that skim milk was not added.

TEST EXAMPLE 9

The miso soups contained in a sealed container, obtained in EXAMPLE 6 and COMPARATIVE EXAMPLE 5, were maintained at a temperature of 30° C., and five panelists were asked to sample them for organoleptic examination with respect to the change with days of the flavor of the miso soup. The results are indicated in Table 4.

TABLE 4

| Days elapsed (day) | EXAMPLE 6 | COMP. EX. 5 |
|---|---|---|
| 0 | 4 | 3 |
| 15 | 4 | 3 |
| 30 | 4 | 3 |
| 60 | 4 | 2 |
| 120 | 3 | 2 |
| 240 | 3 | 1 |
| 360 | 2 | 1 |

As indicated in Table 4, EXAMPLE 6 containing skim milks shows excellent flavor and less change with time as compared with COMPARATIVE EXAMPLE 5 containing no skim milk.

EXAMPLE 7

A miso soup was prepared in the same manner as in EXAMPLE 6 except that 20 parts by weight of a commercially available milk and 10 parts by weight of "Calpis" (trade name, manufactured by Calpis Food Industry Co., Ltd.) were used instead of the skim milk. This miso soup was heat sterilized at a temperature of 100° C. for 30 minutes, and then charged in a commercially available milk pack before the miso soup is not substantially cooled, and immediately sealed to obtain a miso soup contained in a sealed container. With respect to this miso soup, the same test as in TEST EXAMPLE 9 was conducted, and as a result, a product having a further improved flavor and showing less change with the lapse of time as compared with EXAMPLE 6, can be obtained.

EXAMPLE 8

To 4,500 parts by weight of water heated to 80° C., 200 parts by weight of shinshu-miso and 150 parts by weight of aka-miso were leached and added, and further 100 part by weight of a commercially available shijimi (corbicula) extract powder, 1 part by weight of shijimi flavor and 40 parts by weight of "Calpis" (manufactured by Calpis Food Industry Co.,Ltd.) were added. Then, the solid contents were finely ground by a homogenizer to prepare a miso soup. This miso soup was heat sterilized at 130° C. for 70 seconds and charged in a paper container under aseptic condition and sealed to prepare a miso soup beverage contained in a sealed container.

COMPARATIVE EXAMPLE 6

A miso soup beverage contained in a sealed container was prepared in the same manner as in EXAMPLE 8 except that "Calpis" was not added.

TEST EXAMPLE 10

The miso soups obtained in EXAMPLE 8 and COMPARATIVE EXAMPLE 6 were maintained at a temperature of 30° C. and left to stand for 60 days, and five panelists were asked to sample them for organoleptic examination. As a result, it was evaluated that EXAMPLE 8 to which "Calpis" was added shows excellent flavor and tasty as compared with COMPARATIVE EXAMPLE 6.

EXAMPLE 9

To 4,500 parts by weight of water heated to 80° C., 250 parts by weight of aka-miso and 50 parts by weight of shiro-miso were leached and added, and further 100 part by weight of a shijimi (corbicula) extract obtained by extracting the essence of 100 parts by weight of the meat of shijimi with 200 ml of hot water, and 30 parts by weight of a commercially available yogurt were added, and then this was mixed by stirring. Then, the solid contents were finely ground by a homogenizer to prepare a miso soup. This miso soup was charged in an empty can and sealed under reduced pressure, and heat sterilized at a temperature of 110° C. for 20 minutes and cooled to prepare a miso soup beverage contained in a sealed container.

COMPARATIVE EXAMPLE 7

A miso soup beverage contained in a sealed container was prepared in the same manner as in EXAMPLE 9 except that the yogurt was not added.

TEST EXAMPLE 11

The miso soups obtained in EXAMPLE 9 and COMPARATIVE EXAMPLE 7 were maintained at a temperature of 25° C. and left to stand for 90 days, and five panelists were asked to sample them for organoleptic examination. As a result, it was evaluated that EXAMPLE 9 to which yogurt was added shows excellent flavor and tasty as compared with COMPARATIVE EXAMPLE 7 to which no yogurt was added.

As described above, according to the present invention, since at least miso and a milk material are contained as the starting materials of the miso soup and the solid contents of the miso soup are finely ground, even if the heat sterilization is conducted just before or after it is charged in a container, its excellent flavor can be maintained, and the smells of e.g. a can or paper, can be reduced, and further even if substantial time has passed after production, a miso soup beverage with a good flavor like just now produced can be provided. Further, since the solid contents in the miso soup are finely ground and the dispersion stability is improved by the addition of the milk material, it is possible to provide a miso soup beverage wherein the feeling to the tongue and the taste or feeling at the throat are excellent. Further, since the miso soup is charged in a hermetically sealed container and heat sterilized, it stands long time storage and can be drunk as a beverage without using e.g. chopsticks or spoon, whereby it is suitable for sale by vending machines, or sale by booths or kiosks of stations, convenience stores and box lunch shops. Accordingly, the present invention provides a miso soup beverage contained in a sealed container which can readily be drunk anytime and anywhere.

What is claimed is:

1. A miso soup beverage contained in a sealed container wherein miso soup beverage is charged and sealed in a container and heat sterilized, which comprises miso and a milk material as ingredients, wherein solid contents of the ingredients in the miso soup beverage are finely ground and wherein the milk material one obtained by lactic acid fermentation.

2. The miso soup beverage according to claim 1, wherein the miso soup beverage contains from 3 to 100 parts by weight of the milk material as a product having a protein concentration of 3 wt %, and from 1,500 to 2,000 parts by weight of water, based on 100 parts by weight of the miso.

3. The miso soup beverage according to claim 1, which further comprises soy milk.

4. The miso soup beverage according to claim 1, which further comprises at least one selected from the group consisting of an ingredient material, a seasoning and a thickening agent.

5. The miso soup beverage according to claim 4, wherein the seasoning is a shellfish extract.

6. A miso soup beverage according to claim 1, wherein the solid contents have a mean particle size of at most 0.15 mm.

7. The miso soup beverage according to claim 6, wherein at least 80% of the solid contents have a particle size of at most 0.2 mm.

8. The miso soup beverage according to claim 7, wherein at least 90% of the solid contents have a particle size of at most 0.3 mm.

9. A method for producing a miso soup beverage contained in a sealed container, which comprises preparing a miso soup by using a starting material containing at least miso and a milk material, and finely grinding the miso soup by a homogenizer, followed by charging and sealing in a container and then heat sterilizing, or heat sterilizing and then charging and sealing in a container wherein the milk material is one obtained by lactic acid fermentation.

10. The method for producing a miso soup beverage according to claim 9, wherein, the miso soup beverage contains from 3 to 100 parts by weight of the milk material as a product having a protein concentration of 3 wt %, and from 1,500 to 2,000 parts by weight of water, based on 100 parts by weight of the miso.

11. The method for producing a miso soup beverage according to claim 9, wherein the miso soup beverage further comprises soy milk.

12. The method for producing a miso soup beverage according to claim 9, wherein the fine grinding is conducted so that any solid contents have a mean particle size of at most 0.15 mm.

13. The method for producing a miso soup beverage according to claim 9, wherein the miso soup beverage further comprises at least one selected form the group consisting of an ingredient material, a seasoning and a thickening agent.

14. The method for producing a miso soup beverage according to claim 12, wherein the seasoning is a shellfish extract.

15. The method for producing a miso soup beverage according to claim 14, wherein at least 80% of the solid contents have a particle size of at most 0.2 mm.

16. The method for producing a miso soup beverage according to claim 15, wherein at least 90% of the solid contents have a particle size of at most 0.3 mm.

* * * * *